United States Patent
Di Giorgio et al.

(10) Patent No.: US 9,977,125 B2
(45) Date of Patent: May 22, 2018

(54) INNOVATIVE ORBIT DESIGN FOR EARTH OBSERVATION SPACE MISSIONS

(71) Applicant: Thales Alenia Space Italia S.p.A. Con Unico Socio, Rome (IT)

(72) Inventors: Fabio Di Giorgio, Rome (IT); Andrea Francioni, Rome (IT); Alessandro Cricenti, Rome (IT)

(73) Assignee: THALES ALENIA SPACE ITALIA S.P.A. CON UNICO SOCIO, Rome (IT)

( * ) Notice: Subject to any disclaimer, the term of this patent is extended or adjusted under 35 U.S.C. 154(b) by 284 days.

(21) Appl. No.: 14/653,535

(22) PCT Filed: Dec. 20, 2013

(86) PCT No.: PCT/IB2013/061226
§ 371 (c)(1),
(2) Date: Jun. 18, 2015

(87) PCT Pub. No.: WO2014/097263
PCT Pub. Date: Jun. 26, 2014

(65) Prior Publication Data
US 2015/0346336 A1    Dec. 3, 2015

(30) Foreign Application Priority Data
Dec. 20, 2012   (IT) .............................. TO2012A1117

(51) Int. Cl.
*G01S 13/90*   (2006.01)
*G06F 17/10*   (2006.01)
(Continued)

(52) U.S. Cl.
CPC ........ *G01S 13/9023* (2013.01); *B64G 1/1021* (2013.01); *B64G 1/242* (2013.01);
(Continued)

(58) Field of Classification Search
CPC .......... G06F 17/10; G01S 13/88; G01S 13/89; G01S 13/90; G01S 13/9023; B64G 1/10;
(Continued)

(56) References Cited

U.S. PATENT DOCUMENTS 5,051,749 A * 9/1991 Stoyle .................. G01S 13/90
                                                342/137
6,126,116 A * 10/2000 Cellier ................ B64G 1/1007
                                                244/158.4
(Continued)

FOREIGN PATENT DOCUMENTS

EP           2535735 A1    12/2012

OTHER PUBLICATIONS

Gabriel, et al., Mapping Small Elevation Changes Over Large Areas: Differential Radar Interferometry, Journal of Geophysical Research, vol. 94, No. 67, pp. 9183-9191, 1989.
(Continued)

*Primary Examiner* — Bernarr E Gregory
(74) *Attorney, Agent, or Firm* — McCarter & English, LLP

(57) ABSTRACT

The invention concerns a method for reducing the costs of a satellite remote sensing service. The method comprises providing a satellite remote sensing system that includes only one satellite equipped with a sensor configured to acquire images of areas of the earth's surface, the satellite remote sensing system being designed to provide a satellite remote sensing service based on the images acquired by the sensor on board the satellite. In particular, the satellite follows a predefined orbit around the earth with an orbit repeat cycle shorter than three days, whereby a satellite remote sensing service with very good time performance, excellent interferometric capabilities and with drastically reduced costs is obtained.

12 Claims, 6 Drawing Sheets

(51) Int. Cl.
*B64G 1/40* (2006.01)
*B64G 1/10* (2006.01)
*B64G 1/24* (2006.01)

(52) U.S. Cl.
CPC ............. *B64G 1/405* (2013.01); *G06F 17/10* (2013.01); *B64G 2001/1035* (2013.01); *G01S 13/90* (2013.01)

(58) Field of Classification Search
CPC .......... B64G 1/1021; B64G 1/22; B64G 1/24; B64G 1/242; B64G 2001/1035; B64G 1/40; B64G 1/405; B64G 1/1007
See application file for complete search history.

(56) References Cited

U.S. PATENT DOCUMENTS

| | | | |
|---|---|---|---|
| 6,677,884 B2 * | 1/2004 | Moreira | B64G 1/1021 244/158.4 |
| 6,864,828 B1 * | 3/2005 | Golubiewski | G01S 13/9023 342/147 |
| 6,911,932 B1 * | 6/2005 | Martinez | G01S 13/9023 342/118 |
| 2003/0006927 A1 | 1/2003 | Moreira et al. | |

OTHER PUBLICATIONS

Zebker, et al., Decorrelation in Interferometric Radar Echoes, IEEE Transactions on Geoscience and Remote Sensing, vol. 30, No. 5, pp. 950-959, 1992.
Rosengren, ERS-1.—An Earth Observer that Exactly Follows Its Chosen Path, ESA Bulletin, ESA Scientific and Publications Branch, Noordwijk, NL, pp. 76-82, 1992.
Readings, et al., Envisat-1: Europe's Major Contribution to Earth Observation for the Late Nineties, ESA Bulletin, ESA Scientific and Publications Branch, Noordwijk, NL, pp. 15-28, 1993.
Covello, et al., COSMO—SkyMed an Existing Opportunity for Observing the Earth, Journal of Geodynamics, Pergamon, Amsterdam, NL, vol. 49, No. 3-4, pp. 171-180, 2010.
PCT International Patent Search Report dated May 23,2014 for PCT International Patent Application No. PCT/IB2013/061226.

* cited by examiner

INNOVATIVE ORBIT DESIGN FOR EARTH OBSERVATION SPACE MISSIONS

TECHNICAL FIELD OF INVENTION

The present invention concerns an innovative orbit design that enables:
  providing a satellite remote sensing system based on, the use of a single satellite capable of ensuring time performance and interferometric capabilities comparable with those of a system based on the use of a constellation of satellites; and
  reducing the costs of design, development, testing, commissioning, operation, etc. of such a system and, consequently, also of the associated remote sensing service.

STATE OF THE ART

Within the field of Earth observation, due to their ability of continually acquiring data over vast regions everywhere on the Earth's surface, satellite remote sensing systems allow collecting large amounts of information on the Earth's surface of fundamental political, economic and environmental importance.

As is known, satellite remote sensing is mainly based on the use of two types of sensor:
  passive sensors, such as optical and infrared sensors for example, which generally measure the electromagnetic radiation emitted and reflected (in particular, reflected solar electromagnetic radiation) by the Earth's surface; and
  active sensors, such as Synthetic Aperture Radars (SARs) and lidars for example, which generally illuminate the Earth's surface by emitting a predefined electromagnetic radiation and then measure the back-scattered electromagnetic radiation.

With regard to this, for simplicity of description, the term "SAR sensor" will be used hereinafter to indicate a synthetic aperture radar configured to transmit and receive radar signals in predetermined directions by means of an antenna.

Furthermore, always for simplicity of description, the term "acquire a SAR image" (or also "capture a SAR image"), or, equivalently, the term "SAR image acquisition" or also "SAR acquisition" will be used hereinafter to indicate the entire process of forming a SAR satellite image and which, as is known, comprises:
  transmitting radar signals by means of a SAR sensor carried by a satellite, so as da illuminate an area of interest with said radar signals;
  receiving the back-scattered radar signals from said area by means of said SAR sensor; and
  processing the received radar signals by means of a processing unit integrated in the SAR sensor or connected (even remotely) to the SAR sensor, so as to form, or generate, a SAR image of said area on the basis of the received and processed radar signals.

Similarly, always for simplicity of description, the generic term "acquire an image" (or also "capture and image"), or, equivalently, the term "image acquisition" or even just "acquisition", will also be used hereinafter to indicate the entire process of forming a SAR or optical satellite image through the use of a SAR or optical sensor installed on board a satellite.

Unfortunately, as is known, satellite remote sensing systems have extremely high costs for design, development, manufacture, testing, commissioning, etc. Furthermore, the costs of these systems also depend on the desired performance. In particular, one of the main parameters of satellite remote sensing missions is the revisit time which represents a measure of frequency with which it is possible to obtain successive images of one and the same region. In order to reduce the revisit time so as to increase observation capabilities, many modern satellite remote sensing systems use a constellation of satellites. However, as can be easily surmised, the costs of a satellite remote sensing system that uses a constellation of satellites are much higher than those of a single-satellite system. Nevertheless, single-satellite systems are either:
  unable to guarantee time performances comparable to those of systems based on a constellation of satellites;
  or, in the case where they are able to offer time performances comparable to those of systems based on constellations of satellites, they are unable to guarantee global coverage of the Earth's surface.

An example of an Earth observation system based on the use of a single satellite is represented by the European Remote Sensing Satellite ERS-1 of the European Space Agency (ESA). ERS-1 was launched in 1991 in a polar sun synchronous orbit (SSO) at an altitude of 782-785 Km and with the possibility of having three different orbit repeat cycles, in particular a 3-day cycle, a 35-day cycle and a 176-day cycle. ERS-1 terminated its mission in 2000. Further information on the orbit design of ERS-1 is provided in the article by M. Rosengren entitled "*ERS-1—AN EARTH OBSERVER THAT EXACTLY FOLLOWS ITS CHOSEN PATH*", ESA Bulletin, ESA Scientific and Publications Branch, Noordwijk, NL, No. 72, 1 Nov. 1992, pages 76-82, in which the characteristics of the ERS-1's orbit are presented in general, and, in particular:
  of the 3-day orbit repeat cycle, which did not allow achieving global coverage of the Earth's surface;
  of the 35-day orbit repeat cycle that, instead, allowed achieving global coverage of the Earth's surface; and
  of the orbit maintenance manoeuvres performed to compensate for orbital perturbations due to atmospheric drag, solar wind, etc.

A further example of an Earth observation system based on the use of a single satellite is represented by the Envisat satellite, also by ESA. Envisat was launched in 2002 in a polar SSO at an altitude of approximately 800 Km and with a 35-day orbit repeat cycle, chosen so as ensure almost global coverage (dependent on the areas accessible to the various instruments installed on board). Envisat terminated its mission in 2012. Further information on the Envisat satellite is provided in the article by C. J. Readings and P. A. Dubock entitled "*ENVISAT-1: EUROPE'S MAJOR CONTRIBUTION TO EARTH OBSERVATION FOR THE LATE NINETIES*", ESA Bulletin, ESA Scientific and Publications Branch, Noordwijk, NL, No. 76, 1 Nov. 1993, pages 15-28.

Instead, examples of Earth observation systems that are based on the use of constellations of satellites and that, due to these constellations, have high access capabilities with low revisit times are the Italian COSMO-SkyMed system, which comprises four satellites, and the German SAR Lupe system, which comprises five satellites. In particular, further information on the COSMO-SkyMed system is provided in the article by F. Covello et al. entitled "*COSMO-SkyMed an existing opportunity for observing the Earth*", Journal of Geodynamics, Pergamon, Amsterdam, NL, Vol. 49, No. 3-4, 1 Apr. 2010, pages 171-180.

Moreover, the last few years has seen an increase in the importance of interferometric analysis based on SAR images of the Earth's surface for the generation of digital elevation models (DEMs), the analysis of subsidence and estimating terrain changes. In the case of satellite remote sensing systems for interferometric applications, the time between two successive SAR acquisitions has particular importance, as the coherence between successive SAR images drops as the time gap between them increases. Therefore, in the case of interferometric applications, a low revisit time of one and the same site acquires a dual significance, both for the amount of data collected and for its quality.

As is known, satellite remote sensing systems for interferometric applications generally use:

- (at least) a pair of satellites operating in a tandem configuration (as with the TerraSAR-X and TanDEM-X satellites for example) to simultaneously capture SAR images of one and the same area of the Earth's surface; or
- configurations that enable capturing, always by using at least two satellites, SAR images of one and the same area of the Earth's surface at intervals of a predefined number of days (as happens, for example, with the COSMO-SkyMed system and the RADARSAT 1 and 2 satellites).

For example, by using two satellites, the tandem-like configuration of COSMO-SkyMed allows obtaining SAR images of one and the same geographic area for interferometric applications at daily intervals.

Both of the above-mentioned solutions, or rather the use of least two satellites to capture SAR images of one and the same region simultaneously or at an interval of a predetermined number of days, cause an increase in both the complexity and the costs of the satellite remote sensing system employed.

Examples of known radar interferometry techniques are provided in:

- the article by H. A. Zebker and J. Villasenor entitled "*Decorrelation in Interferometric Radar Echoes*", IEEE Transactions on Geoscience and Remote Sensing, Vol. 30, No. 5, 5 Sep. 1992, pages 950-959, in which an interferometry technique based on SAR acquisitions obtained via successive passages of a single satellite is presented;
- the article by A. K. Gabriel et al. entitled "*Mapping Small Elevation Changes Over Large Areas: Differential Radar Interferometry*", Journal of Geophysical Research, Vol. 94, No. B7, 10 Jul. 1989, pages 9183-9191, in which a differential interferometry technique is presented for detecting very small ground movements on the basis of SAR images;
- European patent application EP 2 535 735 A1, which concerns a method for acquiring SAR images for interferometric processing, in particular for generating digital elevation models (DEMs) on the basis of SAR images acquired by a single satellite equipped with a single SAR sensor in a single passage; and
- European patent application EP 1 273 518 A2, which concerns a satellite configuration for interferometric applications.

The very high costs (in terms of design, development, testing, commissioning, launching of satellite(s), etc.) of satellite remote sensing systems effectively still prevent many states from being able to have their own Earth observation satellite system or from being able to have more than one satellite remote sensing system (for example a system that uses optical sensors and a system that uses SAR sensors).

Precisely for this reason, current usage of some satellite remote sensing systems are shared between different states. For example, Italy and France share using the Italian COSMO-SkyMed system based on SAR sensors and the French Helios 2 system based on optical sensors. However, the complexity of managing these shared systems increases due to the increase in complexity of the planning and harmonization logic used for solving possible conflicts. An increase in time between the depositing of acquisition requests and the effective availability of data (known as response time) is also associated with this complexity, as the time related to resource harmonization between the various users is added to that strictly connected to the planning operations.

OBJECT AND SUMMARY OF THE INVENTION

The object of the present invention is to provide an innovative orbit design for Earth observation space missions that enables implementing an Earth observation satellite system with very good time performances and excellent interferometric capabilities and that, at the same time, also allows reducing the costs of design, development, testing, commissioning, operation, etc. of this system and, consequently, also of the associated satellite remote sensing service, in this way also facilitating access to the satellite remote sensing market for those states that are currently excluded due to limited economic capabilities.

This object is achieved by the present invention in so far as it relates to a method for reducing the costs of a satellite remote sensing service and to a satellite remote sensing system, as defined in the appended claims.

BRIEF DESCRIPTION OF DRAWINGS

For a better understanding of the present invention, some preferred embodiments, provided by way of non-limitative example, will now be described with reference to the attached drawings not to scale), where.

DETAILED DESCRIPTION OF PREFERRED EMBODIMENTS OF THE INVENTION

Figure 1:
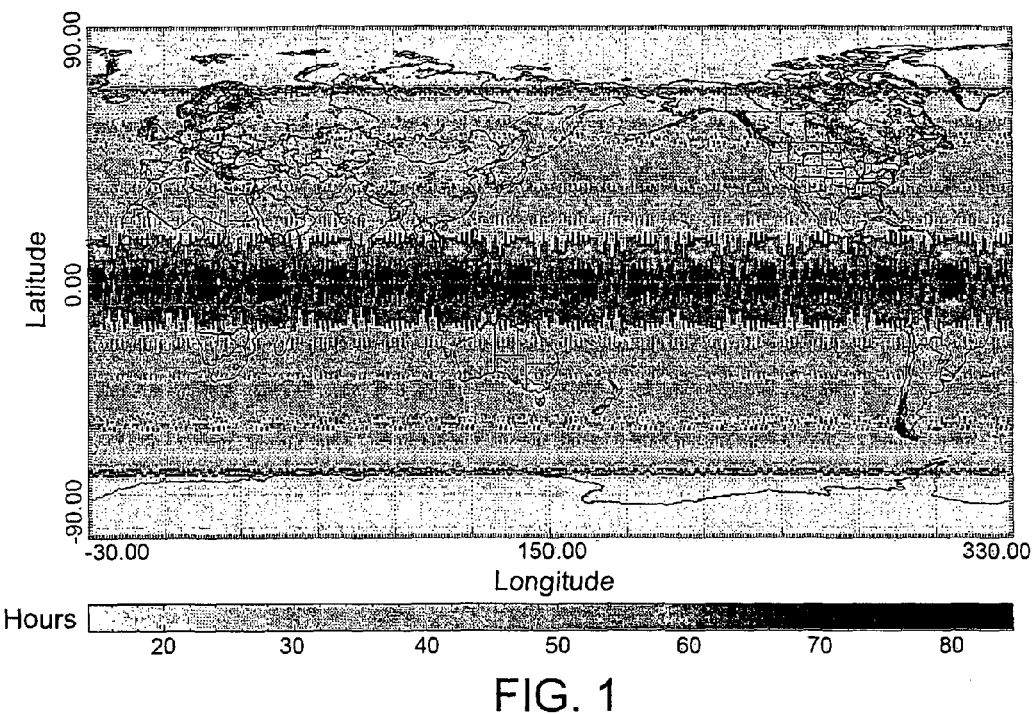
FIG. 1 shows revisit times of the TerraSAR-X satellite with respect to the Earth's surface.

The following description is provided to enable an expert in the field to embody and use the invention. Various modifications to the embodiments shown will be immediately obvious to experts and the generic principles described herein could be applied to other embodiments and applications without departing from the scope of protection of the present invention.

Thus, the present invention is not intended for being limited to the embodiments described and shown herein, but is to be accorded the widest scope consistent with the principles and features disclosed herein and defined in the appended claims.

The present invention concerns an innovative orbit design for Earth observation space missions that enables implementing a satellite remote sensing system that:

- comprises a single satellite, in this way being less expensive than a system based on the use of a constellation of satellites; and, at the same time,
- ensures time performances and interferometric capabilities comparable to those of a system based on a constellation of satellites; and, furthermore,
- leads, through its manner of conception, to a concept of its exclusive utilization over each of the observable nations that, by federating and therefore taking part in the development of the project, leads to a lowering of the related system costs.

As is known, until now orbit design for satellite remote sensing systems has always been based on choosing an orbit repeat cycle such as to ensure global coverage of all potentially accessible terrestrial latitudes, for example, 16 days for the COSMO-Skymed system, 11 days for the TerraSAR-X system and 24 days for the RADARSAT system.

A first aspect of the present invention is instead based on the innovative idea of discarding this basic principle of orbit design by choosing, in order to guarantee a very short maximum revisit time, an orbit with a repeat cycle of less than three days (preferably equal to one or two days) and, therefore, such as to not ensure global coverage of all potentially accessible terrestrial latitudes. As will be described in detail hereinafter, this loss of global access capability enables achieving time performances and interferometric capabilities comparable to those of an Earth observation system based on a constellation of satellites over the regions of the Earth's surface effectively observable from the chosen orbit.

Furthermore, as will also be described in detail hereinafter, the choice of an orbit repeat cycle that does not guarantee global coverage of the Earth's surface leads to sharing utilization of the satellite remote sensing system between different states located within the system's effective area of coverage, guaranteeing each of these states exclusive access to its territory with conflict-free operation and excellent time performance and, at the same time, allowing the costs of design, development, testing, commissioning, operation, etc. of the system to be shared between the different states so that each state can benefit from a satellite observation service for its territory at drastically reduced costs.

It should be noted that for simplicity of description, hereinafter the orbit repeat cycle will also be indicated using more concise terms, such as "orbital cycle" and "repeat cycle".

Conveniently, according to the present invention, Low Earth Orbits (LEOs) are used that, as is known, have altitudes between the Earth's atmosphere and the Van Allen belts, or rather between 160 and 2000 Km; for example, LEOs with nominal altitudes of 400, 600 or 800 Km can be conveniently used.

In particular, according to the present invention, depending on the latitude of the areas of the Earth's surface of interest, it is possible to use polar sun synchronous orbits (SSOs) or inclined orbits to optimize performance over low-latitude areas.

Within the field of satellite remote sensing, orbits are normally defined with an integer number of revolutions around the Earth in a given number of days, which represents the orbit repeat cycle. The longer the repeat cycle, the greater the ground granularity of the orbit. For example, the satellites of the COSMO-SkyMed system perform 237 revolutions in 16 days and, at the end of this period, the satellites are located precisely in their initial positions.

If the resultant interval at the terrestrial equator for a satellite, obtained by dividing the equatorial circumference of the Earth ($Ce=40075$ Km) by the number of revolutions of the satellite in the orbital cycle, is less than the size of the ground access area of the sensor used by said satellite, then global access is guaranteed, or rather the satellite can perform acquisitions on any point of the Earth. Furthermore, the smaller the ratio between this interval and the sensor's ground access area, the greater the number of different angles of incidence in the acquisition of the single images.

However, choosing a long orbital cycle causes a large time gap between two interferometric acquisitions and, in consequence, a reduction in the coherency and accuracy of the acquired data. As previously described, to remedy this problem, current satellite remote sensing systems for interferometric applications use at least two satellites:

- in a tandem configuration to simultaneously capture SAR images of a same area of the Earth's surface; or
- in a configuration that enables capturing SAR images of a same area of the Earth's surface at intervals of a predefined number of days.

Instead, according to the above-stated first aspect of the present invention it is possible to renounce global coverage by using an extremely small orbital cycle, in particular an orbital cycle of a day to ensure a maximum revisit time of 12 or 24 hours, or in any case global access by using an orbital cycle of two days so as to guarantee a maximum revisit time of 48 hours (as will be explained in greater detail hereinafter).

In the case of a one-day orbital cycle, the orbit design provides for between 14 and 16 revolutions per day and this number of revolutions also coincides with the number of revolutions in the orbital cycle. Hence, the ensuing possibility of taking interferometric shots one day apart. The advantage thus clearly emerges in terms of temporal correlation with respect to systems based on a single satellite that can only take interferometric shots at intervals of several days.

In the case of a one-day orbital cycle, it is also evident that the maximum revisit time in areas where there is coverage is exactly 24 hours. Instead, in zones where the ascending and descending tracks intersect, the revisit time is 12 hours.

It should be underlined that the orbital cycle coincides with an integer number days only in the case of a sun synchronous orbit characterized by a rotation of the orbital plane coincident with that of the Earth on the ecliptic. For this reason, the satellite always performs acquisitions at the same local time. Instead, inclined orbits do not generally respect this constraint and therefore when reference is made hereinafter to an orbital cycle of one/two/three day(s), it should be intended as "substantially", or "in the order of", that is to say "approximately" one/two/three day(s), with a variation even of the order of a few hours; this phenomenon causes a variation in the local time of acquisition and, in consequence, a variation in the lighting conditions of the area that is shot.

The use of inclined orbits to increase performance over low-latitude areas is reserved to satellites equipped with SAR sensors, which in this way can benefit from the generation of a very regular grid. Instead, due to their dependence on the conditions of solar illumination on the area of interest, optical satellites are typically employed exclusively on SSOs, furthermore using just the illuminated (ascending or descending) section of the orbit.

Figure 2:
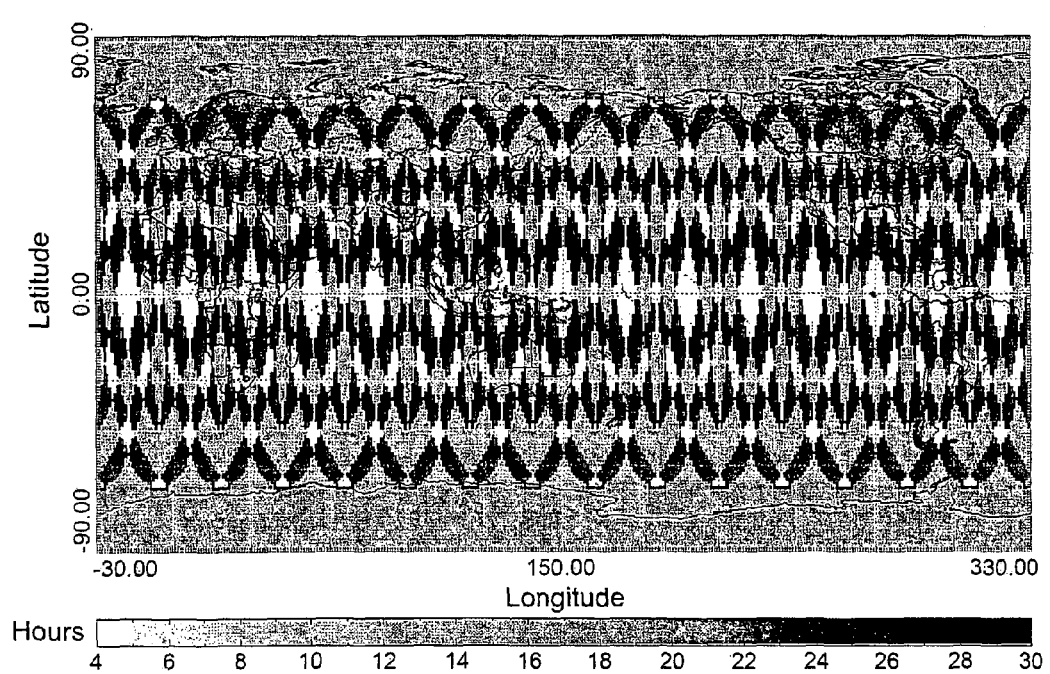
FIGS. 2-4 show revisit times with respect to the Earth's surface of Earth observation systems according to a first, a second and a third embodiment, respectively, of the present invention.

In order to better understand the differences between the time performance of the orbit design according to the present invention and that of traditional Earth observation systems, FIG. 1 shows the revisit times with respect to the Earth's surface of the TerraSAR-X satellite (which, as is known, is equipped with a SAR sensor), while FIG. 2 shows the revisit times with respect to the Earth's surface of an Earth observation system according to a first embodiment of the present invention, in particular a system based on a single satellite having a polar sun synchronous orbit and a one-day orbital cycle.

As shown in FIG. 1, the revisit times of the TerraSAR-X satellite are between 60 and 84 hours in the regions around the equator and between 40 and 50 hours in medium latitude regions.

Conversely, the maximum revisit time of the above-stated Earth observation system according to the first embodiment of the present invention is obviously shortened to 24 hours by design. In particular, the non-accessible areas (coloured white) and the accessible areas with revisit times of 12 and 24 hours can be observed in FIG. 2. Coverage is quite good at medium-high latitudes, whilst at lower latitudes it is necessary to correctly position the areas of interest within the access bands. The ground access pattern shown in FIG. 2 is particularly suited to use of an optical sensor in consideration of the fact that, as is known, an optical sensor generally allows acquiring good quality images of areas at medium-high latitudes (or rather where the coverage shown in FIG. 2 is good), while the quality of optical images of areas on the equatorial band (or rather where the non-accessible areas are more concentrated and extensive in FIG. 2) is generally significantly degraded due to the weather in these areas (for example, due to rain, excessive cloud formations excessive humidity, etc.).

Figure 3:
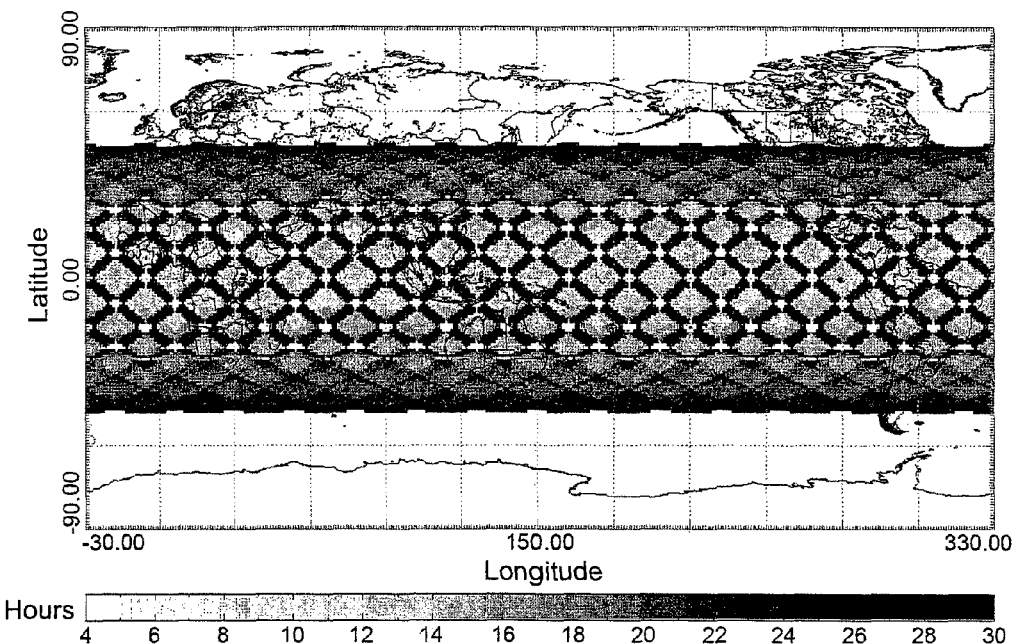

By using an inclined orbit it is still possible to ensure a maximum revisit time of 12-24 hours and it is also possible to optimize the resulting ground grid to obtain areas of predetermined size (for example, in the order of 2400×2400 Km$^2$) such as to ensure complete coverage of the various states. With regard to this, FIG. 3 shows the revisit times with respect to the Earth's surface of an Earth observation system according to a second embodiment of the present invention, in particular a system based on a single satellite equipped with a SAR sensor and having an inclined orbit and a one-day orbital cycle. In FIG. 3, it is evident how the coverage is more regular with respect to that shown in FIG. 2 and, above all, how this coverage in continuous in a band of medium latitudes.

Obviously, it is possible to optimize coverage over different geographic areas by altering the inclination of the orbit to improve coverage over the areas of interest.

The possibility thus ensues of the system being used by various states within the area of coverage, whilst ensuring excellent performance with conflict-free operation.

In particular, the real possibility of covering different states with a ground pattern of the type shown in FIG. 3 gives the system according to the present invention a significant competitive and commercial advantage.

In fact, unlike the orbits normally used for satellite remote sensing, the repeatability of the orbit on a daily basis enables avoiding a complex acquisition planning phase, as the areas accessible from the satellite are the same ones every day.

This brings advantages in the case of usage by a single user, with the generation of a repetitive acquisition plan that ensures coverage of the access area in successive passages, but even more so in the case of usage by different users located in distinct geographic zones, as the satellite can be singly allocated, in particular with a time division strategy, to each user without the need of harmonizing the acquisitions with the other users. In other words, once the operational loads are defined in the design phase, for the various states that are only interested in monitoring their own territory there is no difference between having a satellite always available and having the system according to the present invention available at predefined time intervals. Furthermore, it is important to underline that for states interested solely in monitoring their own territory, the loss of global access does not represent a problem.

This concept thus results in an enormous operational advantage. In fact, several states can form a federation and acquire "shares" of a single satellite remote sensing system, thereby drastically reducing the costs of design, development, testing, commissioning, operation, etc. for each individual state. The exclusive access to their own territory via time division ensures the absence of conflicts and consequently makes the complexity of planning and harmonization (in terms of design and development costs and the associated times) typical of traditional multi-user satellite remote sensing systems superfluous. In other words, the innovative orbit design according to the present invention simplifies both mission planning and resource sharing. In particular, in the case of usage by a federation of states, advantage is derived from the loss of global coverage by offering, in addition to dynamic allocation of usage time for the onboard sensor between the various federated states, also a static allocation on the various orbits so as to allow the various users to have exclusive planning for their territory; this solution is made possible by the rigorous repetitiveness of the orbits, a consequence of the proposed solution.

In this way, thanks to the federation, a state can have exclusive access to its territory at a fraction of the cost of a traditional single-user system. This characteristic is able to significantly lower the barriers to entering the satellite remote sensing market for those states that have traditionally been excluded due to limited economic capabilities.

With regard to this, it is important to underline that, as shown in FIG. 3, the performance of the present invention can be conveniently optimized over states (in particular, countries in Africa, Latin America and South-east Asia) that are currently excluded from the satellite remote sensing market due to limited economic capabilities. Therefore, the present invention also enables these states to benefit from a proper satellite remote sensing service.

In any case, it should be remembered yet again that the inclined orbit, due to variable illumination conditions, is not suitable for satellites equipped with optical payloads, which are therefore limited to using SSOs.

Optimization of the orbit according to the present invention is conveniently carried out by balancing the following parameters as best as possible:
orbit altitude;
orbit inclination; and
ground access area of the sensor employed.

An accurate preliminary study of the mission is therefore necessary in order to increase the contiguous access area and maximize ground coverage.

As previously described, the orbit design according to the present invention does not allow global coverage and has limited ground access diversity; in fact, each target can only be acquired with one or two viewing angles, while it is normally preferable to have the possibility of choosing access among several available angles.

Figure 4:
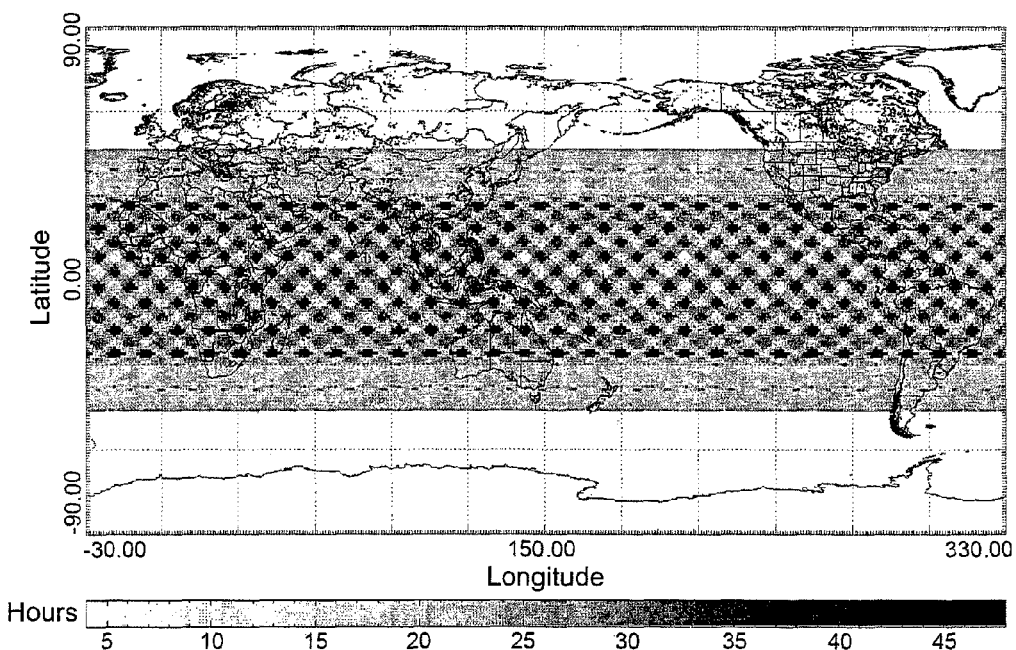

To remedy these drawbacks, it is possible to choose an orbit with an orbital cycle of two days instead of just one. Obviously, in this case, the maximum revisit time rises to approximately 48 hours, but this orbital cycle ensures global access (in the case of an inclined orbit, global access within the chosen band of latitudes) and enables increasing the available number of angles of incidence (except for certain areas that are still characterized by just one access in the orbital cycle). With regard to this, FIG. 4 shows the revisit times with respect to the Earth's surface of an Earth observation system according to a third embodiment of the present invention, in particular a system based on a single satellite equipped with a SAR sensor and having an inclined orbit and a two-day orbital cycle.

Obviously, by continuing to increase the orbital cycle, the maximum revisit time rises more and more until it becomes comparable to that of a traditional satellite remote sensing system, thereby losing the above-stated advantages achieved by the present invention.

With regard to this, it should be noted that the above-mentioned articles "*ERS-1—AN EARTH OBSERVER THAT EXACTLY FOLLOWS ITS CHOSEN PATH*" and "Decorrelation in Interferometric Radar Echoes" both describe the use of a three-day orbit repeat cycle for missions of a typically scientific nature. In fact, in the sphere of scientific missions, it becomes important for being able to observe the same scene again with the same geometry after a few days to avoid there being significant changes that could then affect the capacity to perform information retrieval. Instead, the present invention is based on a system concept: the orbit is chosen with a low orbital cycle, in particular less than three days, for being able to ensure very good time performances, or rather very low revisit times, over the areas accessible from the satellite, which leads to a concept of lowering costs if several states "seen" by the satellite decide to take part in a joint development of the satellite remote sensing system in order to acquire satellite images of their own territory.

Moreover, a second aspect of the present invention concerns the interferometric capabilities of the satellite remote sensing system. With regard to this, before continuing with the description of the present invention, the meaning of certain specific terms widely known in the SAR interferometry sector (some of which will be used hereinafter to describe the above-stated second aspect of the present invention in detail) is provided below:
baseline—distance between two acquisition positions of two SAR images of a same target, in particular of a same area of the Earth's surface;
line of sight—line segment that connects the target and one of the two acquisition positions which is assumed as the position at which the so-called master acquisition is performed;
path difference—difference between the two paths that connect the target to the two acquisition positions;
orthogonal baseline—component of the baseline that is perpendicular to the line of sight;
effective baseline—component of the orthogonal baseline that is parallel to the direction along which the target altitude is measured; the presence of an effective baseline determines a correlation between the path difference and the target altitude and, therefore, enables interferometry;
interferometric ambiguity distance—distance between two targets that, altitudes being equal, have the same path difference;
critical baseline—the effective baseline value for which the interferometric ambiguity distance coincides with the resolution of the acquired SAR images;
ambiguity height—difference in altitude of a target that results in a path difference equal to the wavelength of the radar signals used; and
geometric decorrelation—decorrelation caused by the fact that a same target is seen from two different angles and therefore has different phase behaviour.

Returning to the description of the present invention, according to the above-stated second aspect of the invention, in addition to an extremely short orbital cycle (preferably one or two days), the orbit design also provides for slow longitudinal drift of the ground track that, although keeping the orbital frame (or rather the longitudes of passing through the equator) almost fixed, causes a slight variation. This effect enables adjusting the baseline between successive interferometric SAR acquisitions with extreme accuracy.

The interferometric baseline represents an extremely important parameter in so-called SAR cross-track interferometry. In particular, a relation exists between the orthogonal baseline and the accuracy of the altitude measurement, as with the ambiguity height.

The interferometric baseline (in any case, a function of the latitude) is proportional to the orbit's longitudinal drift. In fact, it is evident that by passing through exactly the same orbit a day later, shots of the same position would be taken and this would not enable interferometric measurements.

In current remote sensing systems that perform interferometric shots via successive passages at intervals of an orbital cycle (or rather every 16-25 days) of a same single satellite, the orbital perturbations (atmospheric drag, solar wind, etc.) that cause a deviation from the ideal orbit are normally exploited to generate a baseline that can be used for SAR interferometry. However, this effect, caused by a "disturbance" of the nominal orbit, is obviously difficult to control and the resulting baseline is consequently not very accurate.

On the contrary, the second aspect of the present invention provides for the voluntary generation of longitudinal drift (generated through an appropriate choice of satellite altitude) with extremely high accuracy. In fact, since the orbital perturbations after a day are of very limited magnitude, the orbit design according to said second aspect of the present invention expressly provides for a longitudinal displacement of the orbit, in particular a displacement of the longitude of the ascending node, so as to generate a desired cross-track baseline at a latitude of interest. Conveniently, provision can also be made to vary the value of the baseline during the remote sensing mission by performing specific orbit correction manoeuvres.

Albeit very slowly, the generated drift tends to move the satellite away from a predefined nominal ground operation zone. This effect, if not compensated, on one hand tends to reduce the size of the ground access area usable for the purposes of SAR acquisitions while, on the other, it enables acquisition of SAR images of zones outside the nominal ground access area of the SAR sensor. However, in any event, after a predefined time interval, it is convenient to reverse the direction of translation to keep the satellite within its predefined zone of operation. This entails a manoeuvre of slightly greater magnitude than orbit maintenance manoeuvres performed to keep the baseline stable.

As is known from Kepler's Laws, a relation of direct proportionality exists between the orbital period and the orbit's semi-major axis. Therefore, by selecting the altitude of the orbit so as to have a difference of a few seconds with respect to an integer number of days in the orbital period (for a sun synchronous orbit), it is possible to cause a translation of the crossing of the equator with respect to the previous orbital cycle.

This so-calculated longitudinal translation at the equator becomes a variable difference of position along the orbit according to the following law (which is applicable in the range of latitudes below the curvature of the orbit):

$$b\_cross(lat)=b\_cross(0)*\cos(lat)*\sin(i),$$

where
- lat indicates the latitude;
- b_cross(lat) indicates the cross-track baseline as a function of latitude;
- b_cross(0) indicates the baseline at the equator;
- cos indicates the cosine function;
- sin indicates the sine function; and
- i indicates the angle of inclination of the orbit with respect to the Earth's equatorial plane (as is known, for a polar orbit, i=90°).

Given the latitude of the area of interest, it is then sufficient to determine the desired baseline in this area to calculate the baseline necessary at the equator and, in consequence, the delay (or advance) with respect to the 24 hours to assign to the orbital cycle.

As the Earth completes a rotation in 24 hours (or 86400 seconds), it turns around its axis with a tangential velocity of Ce/86400 (Km/s), or approximately 500 m/s (considering the equatorial circumference of the Earth Ce equal to 40075 Km). Therefore, 500 meters would be the ground baseline value with a difference of one second in crossing the equator with respect to the previous orbital cycle, while the orbit baseline value is, for orbits with reduced eccentricity, proportional to the factor sma/Re, where Re indicates the Earth's radius (approximately 6378 Km) and sma indicates the semi-major axis of the orbit (for example, considering a satellite altitude of 600 Km, sma can be equal to 6978 Km).

In particular, the orbit baseline can be expressed as $$b\_cross(h) = b\_cross(0) * \frac{Re+h}{Re},$$

where h indicates the orbit altitude at a latitude of interest, in this way resulting in b_cross(h) indicating the orbit baseline and b_cross(0) indicating the ground baseline.

This relation is strictly applicable assuming that the Earth is spherical. With regard to this, it is important to underline that the variations caused by the difference between the equatorial radius and the polar radius of the Earth (approximately 11 Km) are generally negligible. In any case, by using an ellipsoidal model for the Earth it is always possible to determine the orbit baseline with greater accuracy.

To provide an example, consider that at a nominal altitude of approximately 600 Km (sma=6978 Km for approximately 15 revolutions per day), an altitude difference of 50 m causes a variation in the orbital period of approximately 0.06 s, which enables obtaining a daily cross-track baseline of 34 meters at the equator (value already referred to the reference altitude). The stability of this value as altitude varies is very good: a difference of 100 Km in the sma results in a variation of less than 1 meter in the daily cross-track baseline.

As previously described, a translation reversal manoeuvre is performed, after a predefined time interval, to cause drift having the same absolute value but in the opposite direction. Considering a nominal altitude of approximately 600 Km again, for a satellite platform with a mass of around 2000 Kg this translation reversal manoeuvre can conveniently require a delta-v in the order of 0.05 m/s, which corresponds to a consumption of approximately 45 grams of chemical propellant.

Figure 5:
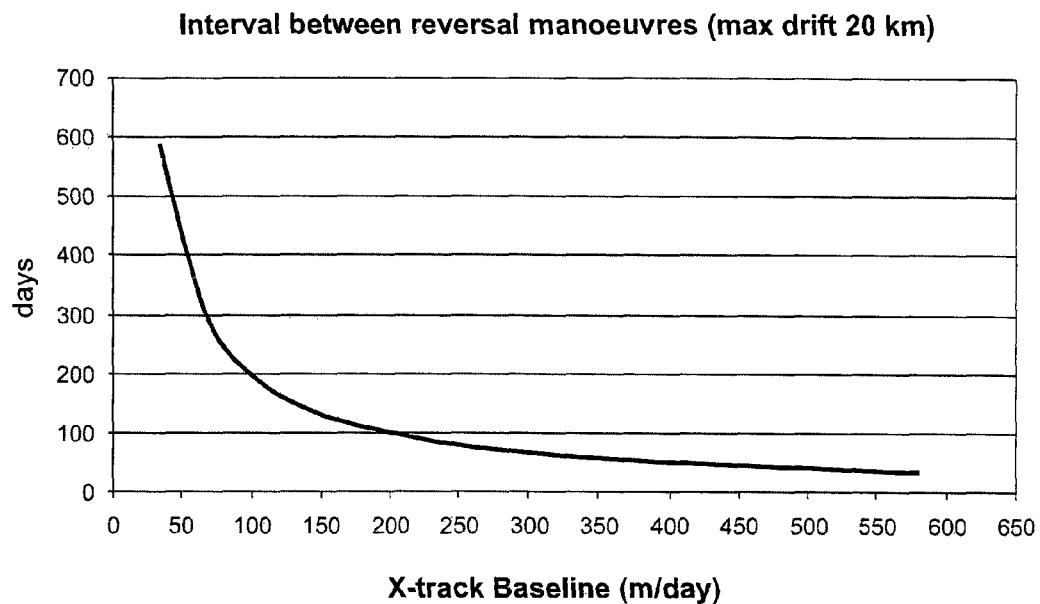
FIGS. 5 and 6 show example graphs of the time passing between two successive manoeuvres for reversing the translation of the ground track of an operative satellite as a function of, respectively, the daily cross-track baseline used and the change in the major semi-axis of the satellite's orbit, according to a specific aspect of the present invention.

To conclude this analysis, the maximum tolerable value for the translation with respect to the ground reference position must be evaluated. Assuming that it is not wished to consider a displacement of the of the SAR sensor's ground access area, a maximum overall ground drift in the order of 20 Km can certainly be tolerated (assuming that 20 Km represents less than 10% of the SAR sensor's ground access area). To remain substantially within this value with a daily cross-track baseline of 34 m, it is feasible to perform a translation reversal manoeuvre approximately every 600 days. In maintaining a maximum overall ground drift of 20 Km, the time interval between two successive translation reversal manoeuvres rapidly decreases as the daily cross-track baseline grows, as is illustrated in FIG. 5. For example, with reference to FIG. 5, by using a daily cross-track baseline of 100 m, the time between two successive translation reversal manoeuvres is approximately 200 days (in FIG. 5, the cross-track baseline is indicated as "X-track Baseline").

Figure 6:
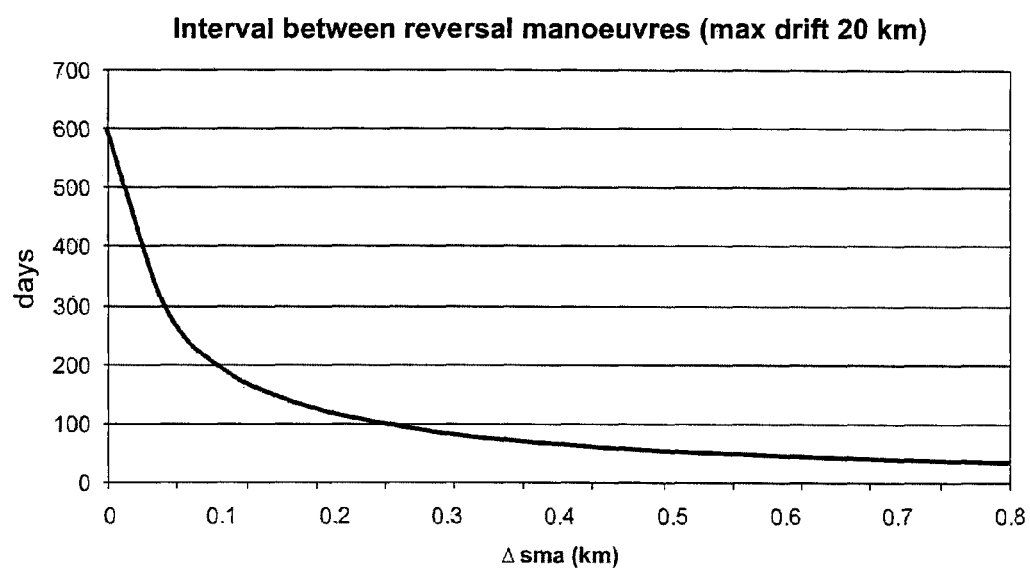

FIG. 6 shows a graph of the time passing between two successive translation reversal manoeuvres, again in the case of maximum overall ground drift of 20 Km, but this time as a function of sma variation.

Figure 7:
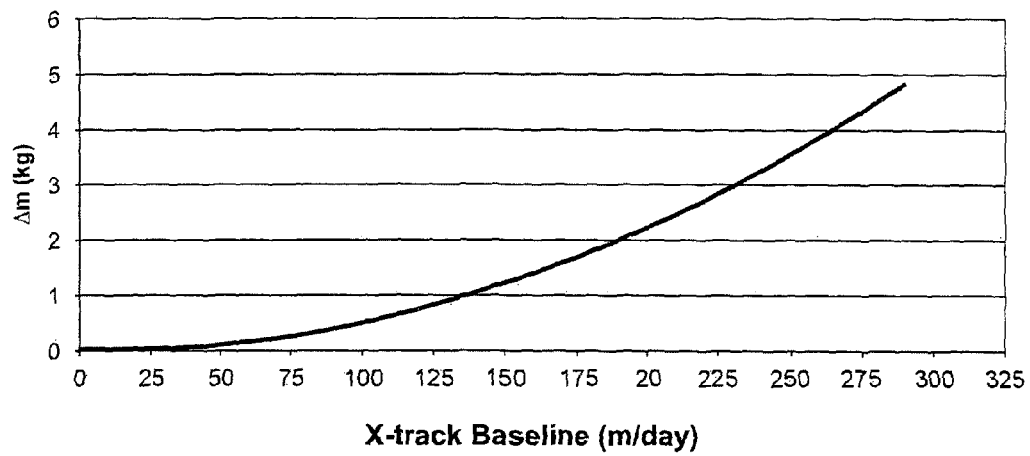
FIG. 7 shows an example graph of propellant consumption due to just the manoeuvres for reversing the translation of the satellite's ground track as a function of the daily cross-track baseline, according to the above-stated specific aspect of the present invention.

To obtain larger baselines, in addition to reducing the time interval between successive translation reversal manoeuvres, a growing delta-v associated with the greater variation of the sma is necessary, which, for the same amount of propellant taken aboard, entails a reduction in the operational life of the satellite. With regard to this, FIG. 7 shows a graph of propellant consumption (due to just the translation reversal manoeuvres of the satellite) as a function of the daily cross-track baseline (in FIG. 7, the cross-track baseline is indicated as "X-track Baseline") to maintain a maximum overall ground drift of 20 Km during the course of a 5-year mission.

Figure 8:
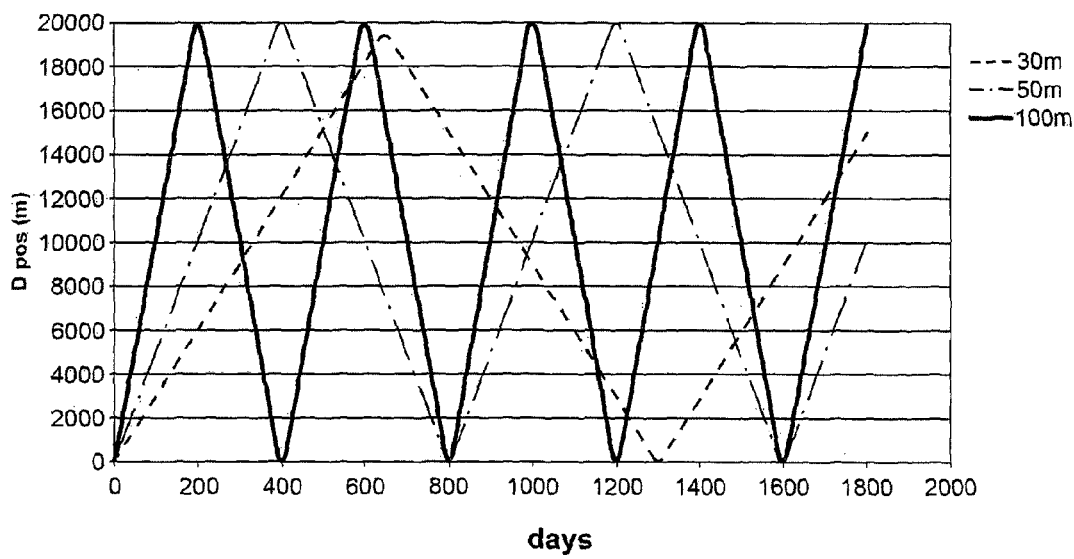
FIG. 8 shows the change in position of a satellite's ground track as a function of time for three different daily cross-track baselines, according to the above-stated specific aspect of the present invention.

Instead, FIG. 8 shows a graph of the change in position of the ground track as a function of time for three different daily baselines (30, 50 and 100 m per day), always considering a maximum overall ground drift of 20 Km. It is evident from FIG. 8 how, as the daily baseline increases, the number of translation reversal manoeuvres also increases correspondingly for the same maximum overall ground drift (20 Km). Naturally, the number of manoeuvres can be reduced by increasing the value of the maximum overall ground drift.

Figure 9A:
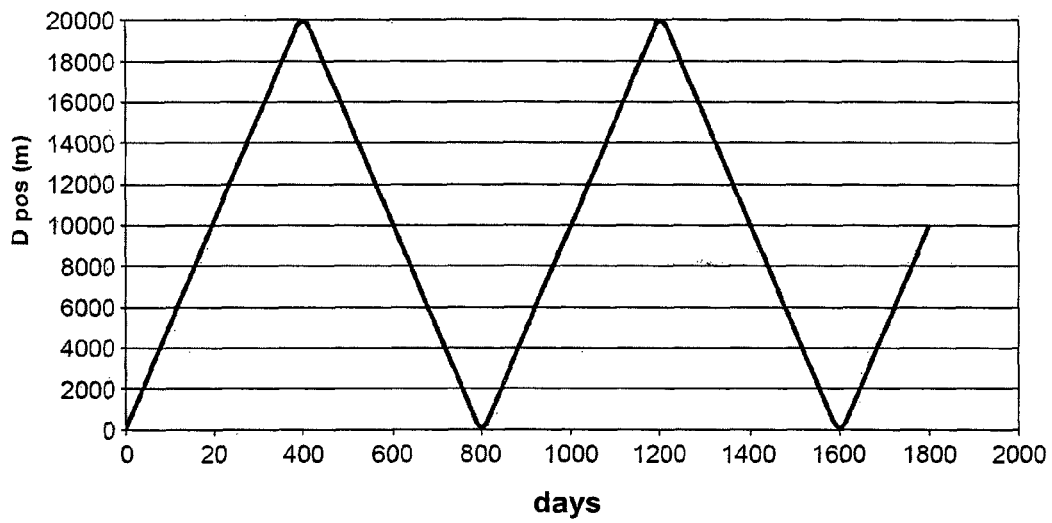
FIGS. 9*a* and 9*b* respectively show the change in position of the ground track and the corresponding change in satellite altitude (with respect to a respective nominal altitude) as a function of time for a given daily cross-track baseline, according to the above-stated specific aspect of the present invention.
Figure 9B:
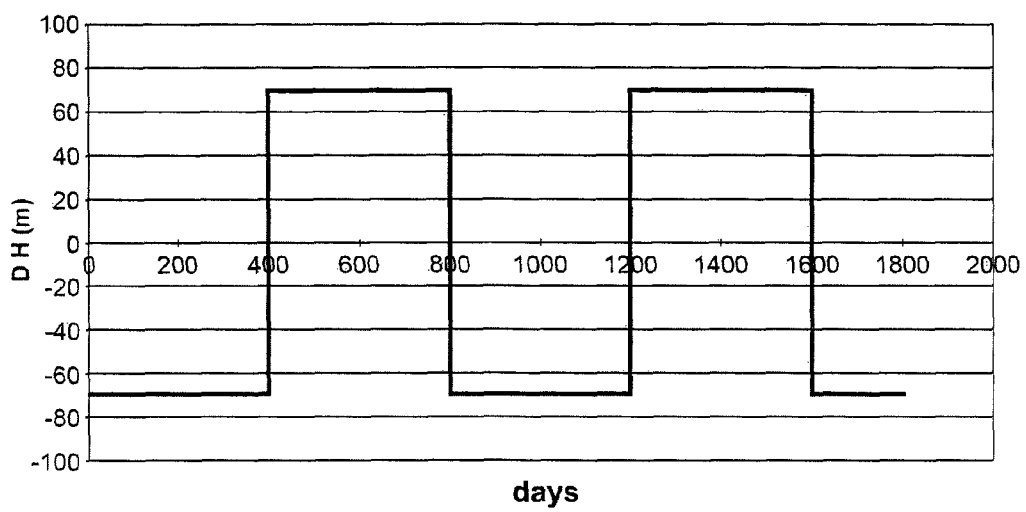

Furthermore, FIGS. 9a and 9b respectively show the change in position of the ground track and the corresponding variation in satellite altitude with respect to the nominal altitude (corresponding to the axis of the abscissae of the graph in FIG. 9b) as a function of time for a daily baseline of 50 m per day.

Considering that the desired baseline values require different temporal differences typically of less than a second, it can be deduced that good orbit control is required (through the execution of special orbit maintenance manoeuvres) to ensure stability of the baseline, where this was absolutely necessary. In any case, it should be underlined that a certain tolerance is acceptable for normal applications. However, stability of the baseline over time obtained through performing special orbit maintenance manoeuvres is decidedly greater with respect to that obtained by exploiting orbital perturbations in traditional satellite remote sensing systems that take interferometric shots via successive passages at intervals of an orbital cycle of a same single satellite.

Clearly, when the orbit design is defined for a remote sensing mission, it is necessary to find a trade-off between the following quantities:

precision in maintaining the baseline and therefore of the frequency of performing the orbit maintenance manoeuvres for maintaining the baseline; and maximum overall ground drift before performing a translation reversal manoeuvre, said quantity, as previously described, depends on the daily baseline and determines the number of translation reversal manoeuvres planned for the entire remote sensing mission.

The overall delta-v budget for the mission and, consequently, also the duration of the satellite's operational life based on the propellant loaded aboard, depends on this trade-off.

In turn, the volume of the propellant on board is also the result of a trade-off in the definition of the satellite's configuration.

Given the small magnitude of the orbit maintenance manoeuvres for maintaining the baseline, ion propulsion can be conveniently used for maintaining the baseline, in this way reducing use of the chemical propellant and therefore ensuring a further degree of freedom in the above-mentioned trade-offs. The installation of ion propulsion must in any case be evaluated in the light of increased complexity and cost in a system that distinguishes itself for low development and usage costs.

It is necessary to point out that, due to the characteristic low specific impulse of ion engines, the accuracy in achieving the necessary delta-v for the orbit maintenance manoeuvre is better with ion propulsion than with chemical propulsion.

A second advantage achievable with ion propulsion resides in the possible strategy of orbit control. In fact, due to the limited consumption and the accuracy given by the reduced specific impulse of ion engines, it is possible to consider performing every day, a few revolutions before arriving over the area of interest, a minimum adjustment of the orbit based on the difference with respect to the day before. The thus attainable advantage is that, if necessary, a baseline accuracy in the order of millimeters can be ensured.

Instead, for drift reversal manoeuvres, the use of chemical propulsion is preferable due to the greater magnitude of the manoeuvre.

Another interesting effect of the orbit design proposed herein is that performing repeated SAR acquisitions at intervals of a day on a same target (all obtained with the same angle of incidence) gives, for example, in the case of three SAR acquisitions, two pairs of SAR acquisitions with a one-day time gap and a nominal baseline, and a pair of SAR acquisitions with a two-day time gap and a baseline twice the nominal one.

This reasoning can be clearly generalized for N SAR acquisitions: N−1 pairs of SAR acquisitions at one-day intervals and nominal baseline B, N−2 pairs of SAR acquisitions at two-day intervals and baseline 2B and so on until arriving at a pair of SAR acquisitions at an interval of N−1 days and baseline (N−1)*B.

The availability of consistent data (or rather successive measurements with equivalent baselines) enable averaging the altitude reconstruction error, thereby obtaining a further improvement in the results of interferometric analysis, as well as the possibility of detecting ground changes and performing short-period differential interferometry (to detect displacements of a target).

Summarizing, the present invention is implemented by means of a satellite remote sensing system that comprises a single satellite that is equipped with a EAR or optical sensor and that, in use, orbits around the Earth in accordance with the previously described innovative orbit design forming the subject of the present invention, in particular by following an inclined or polar sun synchronous orbit that has a very short orbital cycle and, preferably, translating its ground track at each orbital cycle by means of a suitable selection of the altitude in order to ensure a predefined interferometric baseline for images of same areas of the Earth's surface acquired by the sensor in successive orbital cycles.

Figure 10:
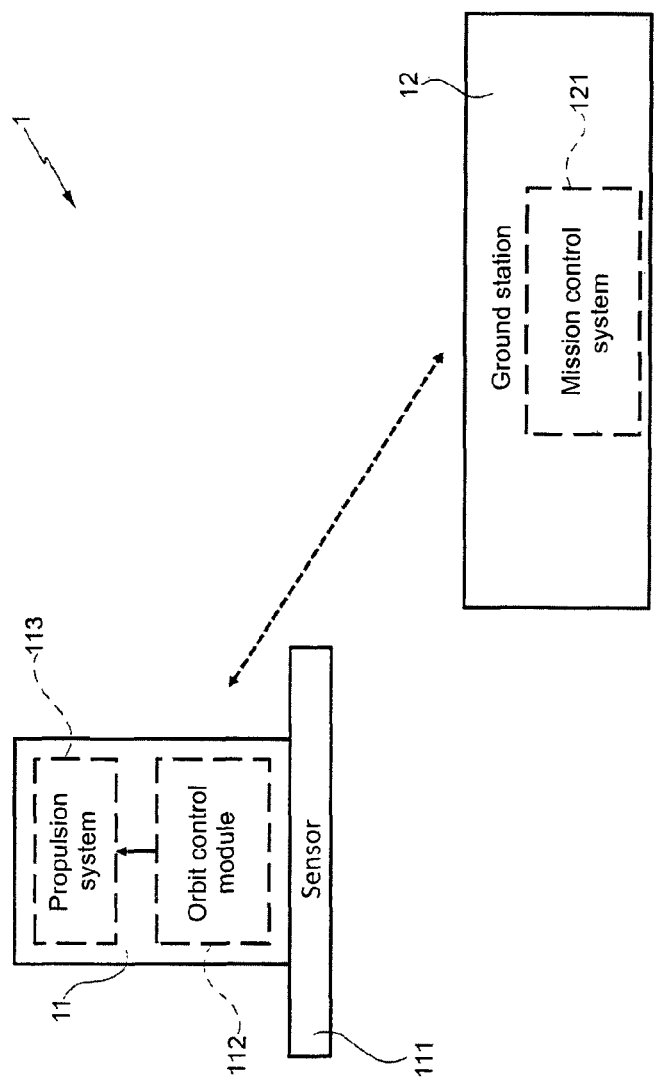
FIG. 10 schematically shows a satellite remote sensing system according to a preferred embodiment of the present invention.

With regard to this, FIG. 10 schematically shows a satellite remote sensing system (not to scale, and indicated as a whole by reference numeral 1) according to a preferred embodiment of the present invention.

In particular, as shown in FIG. 10, the satellite remote sensing system 1 comprises:

a satellite 11 that includes
a sensor 111 designed to acquire images of areas of the Earth's surface,
an orbit control module 112, and
a propulsion system 113 that can be operated by the orbit control module 112; and
a ground station 12 that is positioned on the Earth's surface, is configured to remotely communicate with the satellite 11 (for example to receive the images acquired by the sensor 111) and includes a mission control system 121 designed to remotely control the orbit control module 112.

As previously described, in use, the satellite follows a predefined orbit around the Earth that comprises a predefined number of revolutions around the Earth for each orbital cycle.

As previously described, the orbital cycle is shorter than three days. Preferably, the orbital cycle is approximately equal to one or two days.

Again, as previously described, the satellite 11 is preferably designed to follow the predefined orbit around the Earth, orbiting at least at one predefined altitude that causes the ground track of the satellite 11 to undergo a longitudinal translation at each orbital cycle, such as to ensure a predefined interferometric baseline for images of same areas of the Earth's surface acquired by the sensor 111 in successive orbital cycles.

In particular, the satellite 11 is designed to:
follow the predefined orbit around the Earth, orbiting at a first predefined altitude that causes the ground track of the satellite 11 to undergo a first longitudinal translation at each orbital cycle, such as to ensure the predefined interferometric baseline for images of same areas of the Earth's surface acquired by the sensor 111 in successive orbital cycles, and at a second predefined altitude that causes the ground track of the satellite 11 to undergo a second longitudinal translation at each orbital cycle that is opposite to the first longitudinal translation and is such as to also ensure said predefined interferometric baseline for images of same areas of the Earth's surface acquired by the sensor 111 in successive orbital cycles; and reversing the longitudinal translation of its ground track by moving from the first predefined altitude to the second predefined altitude and vice versa.

Preferably, the satellite 11 is designed to reverse the longitudinal translation of its ground track by moving:

from the first predefined altitude to the second predefined altitude after a first predefined period of time in which its ground track has undergone the first longitudinal translation; and from the second predefined altitude to the first predefined altitude after a second predefined period of time in which its ground track has undergone the second longitudinal translation.

Conveniently, the first and second predefined periods of time are equal.

Again, conveniently, the predefined orbit around the Earth is associated with a predefined nominal altitude, the first predefined altitude is higher than the predefined nominal altitude and the second predefined altitude is lower than the predefined nominal altitude. More conveniently, the first and second predefined altitudes are symmetrical with respect to the predefined nominal altitude.

Conveniently, the predefined number of revolutions around the Earth per orbital cycle and the orbital cycle are such as to allow the sensor 111 to only acquire images of areas of the Earth's surface at predefined latitudes.

Furthermore, the onboard orbit control module 112 is designed to:

perform orbit maintenance manoeuvres by operating the propulsion system 113 so as to keep the longitudinal translation of the ground track of the satellite 11 stable; and perform manoeuvres for reversing the longitudinal translation of the ground track of the satellite 11 by operating the propulsion system 113 so as move the satellite 11 from the first predefined altitude to the second predefined altitude and vice versa.

Preferably, as previously described, the propulsion system 113 comprises an ion propulsion system (not shown in FIG. 10 for simplicity of illustration) and a chemical propulsion system (not shown in FIG. 10 for simplicity of illustration) and the orbit control module 112 is designed to perform:

orbit maintenance manoeuvres by operating the ion propulsion system; and manoeuvres for reversing the longitudinal translation of the ground track of the satellite 11 by operating the chemical propulsion system.

Alternatively, the propulsion system 113 can be a chemical propulsion system used both for orbit maintenance manoeuvres and for manoeuvres of reversing the longitudinal translation of the ground track of the satellite 11.

Preferably, the sensor 111 is a SAR sensor and the predefined orbit is a polar sun synchronous orbit or, in order to optimize ground coverage, an inclined orbit.

Alternatively, the sensor 111 is an optical sensor and the predefined orbit is a polar sun synchronous orbit.

Preferably, the mission control system 121 is designed to:

enable a user to modify the values of the first and second predefined altitudes during the mission, so as to modify the predefined interferometric baseline; and communicate the modified values of the first and second predefined altitudes to the orbit control module 112 so that this orbit control module 112 starts to control the satellite 11 in accordance with these modified values so as to ensure the new predefined interferometric baseline requested by the user.

The advantages of the present invention can be immediately appreciated from the foregoing description.

In particular, it is important to underline yet again the fact that, because it is based on the use of a single satellite, the Earth observation system according to the present invention is less expensive than an Earth observation system based on the use of a constellation of satellites and, in any case, is able the ensure time performances and interferometric capabilities similar to those of a system based on the use of a constellation of satellites.

In particular, the present invention enables:

reducing the cost of the system thanks to the federation of several states; in fact, although this concept has already been used in other currently operational systems (for example the Italian COSMO-SkyMed system and the French Helios 2 system), due to how the orbit is constructed (and therefore the related accessible areas), the present invention leads to using different logic based on time-division utilization of the satellite remote sensing resources; in this way, each state can benefit from the system's resources only in relation to the portion of orbit in which the satellite is able to acquire images of said state; this strategy has the advantage of significantly simplifying planning and negotiation logic due to the absence of operational conflicts with other states;

achieving better performance with respect to that obtainable with traditional single-satellite systems; in fact, the invention, which is based on the concept of going against the general principle of orbit design that contemplates choosing the orbit having a repeat cycle such as to ensure a coverage over all of the area that is latitude accessible (or rather global coverage of the Earth's surface for polar SSOs and on any longitude of the band of latitudes accessible for inclined orbits), enables achieving time performance comparable with that obtained using a constellation of satellites; and performing interferometric analysis at time intervals of a day; this capability, until now only obtainable with systems based on the use of a constellation of satellites, is guaranteed by choosing an orbit with an orbital cycle reduced to a day.

Finally, it is clear that various modifications can be applied to the present invention without departing from the scope of the invention, as defined in the appended claims.

The invention claimed is:

1. A method for reducing the costs of a satellite remote sensing service, comprising providing a satellite remote sensing system (1) that:

includes only one satellite (11) equipped with a sensor (111) configured to acquire images of areas of the Earth's surface; and is designed to provide a satellite remote sensing service based on the images acquired by the sensor (111) on board the satellite (11);

wherein the satellite (11) follows a predefined orbit around the Earth with an orbit repeat cycle shorter than three days whereby:

the satellite remote sensing system (1) provides a satellite remote sensing service only for predefined areas of the Earth's surface positioned in a strip comprised between two predefined latitudes and centered on the equator;

the satellite (11) follows said predefined orbit around the Earth by orbiting at a first predefined altitude that is higher than the predefined nominal altitude and that causes a first drift of ascending node longitude at each orbit repeat cycle, which first drift results in satellite's ground track undergoing, at each orbit repeat cycle, a corresponding first translation of longitudes of crossing of the equator, and at a second predefined altitude that is lower than the predefined nominal altitude and that causes a second drift of the ascending node longitude at each orbit repeat cycle, which second drift is opposite to the first drift and results in satellite's ground track undergoing, at each orbit repeat cycle, a corresponding second translation of the longitudes of crossing of the equator that is opposite to the first translation;

wherein said first and second translations are such that to enable the sensor (111) to acquire images of different areas of the Earth's surface in successive orbit repeat cycles, thereby increasing overall ground coverage of the satellite remote sensing system (1), or ensure a predefined interferometric baseline for images of same areas of the Earth's surface acquired by the sensor (111) in successive orbit repeat cycles; and the satellite (11) reverses the translation of its ground track by moving from the first predefined altitude to the second predefined altitude after a first predefined period of time in which its ground track has undergone the first translation, and from the second predefined altitude to the first predefined altitude after a second predefined period of time in which its ground track has undergone the second translation.

2. The method of claim 1, wherein the first and second predefined periods of time are equal.

3. The method of claim 1, wherein the first and second predefined altitudes are symmetrical with respect to the predefined nominal altitude.

4. The method according to claim 1, wherein the orbit repeat cycle is approximately equal to one or two days.

5. The method according to claim 1, wherein the sensor (111) is a Synthetic Aperture Radar (SAR) and wherein the predefined orbit is a polar sun synchronous orbit or an inclined orbit.

6. The method according to claim 1, wherein the sensor (111) is an optical sensor and wherein the predefined orbit is a polar sun synchronous orbit.

7. A satellite remote sensing system (1) that:

includes only one satellite (11) equipped with an orbit control module (112), a propulsion system (113) and a sensor (111) configured to acquire images of areas of the Earth's surface; and a ground station (12) that is positioned on the Earth's surface and includes a mission control system (121);

the ground control station (12) and the satellite (11) being configured to remotely communicate with each other;

the mission control system (121) being configured to remotely control the orbit control module (112);

the ground station (12) being configured to receive the images acquired by the sensor (111) from the satellite;

wherein the satellite (11) follows a predefined orbit around the Earth associated with a predefined nominal altitude and with an orbit repeat cycle shorter than three days whereby the satellite remote sensing system (1) provides a satellite remote sensing service only for predefined areas of the Earth's surface positioned in a strip comprised between two predefined latitudes and centered on the equator;

the satellite (11) follows said predefined orbit around the Earth by orbiting at a first predefined altitude that is higher than the predefined nominal altitude and which causes a first drift of ascending node longitude at each orbit repeat cycle, which first drift results in satellite's ground track undergoing, at each orbit repeat cycle, a corresponding first translation of longitudes of crossing of the equator, and at a second predefined altitude that is lower than the predefined nominal altitude and which causes a second drift of the ascending node longitude at each orbit repeat cycle, which second drift is opposite to the first drift and results in satellite's ground track undergoing, at each orbit repeat cycle, a corresponding second translation of the longitudes of crossing of the equator that is opposite to the first translation;

wherein said first and second translations are such that to enable the sensor (111) to acquire images of different areas of the Earth's surface in successive orbit repeat cycles, thereby increasing overall ground coverage of the satellite remote sensing system (1), or ensure a predefined interferometric baseline for images of same areas of the Earth's surface acquired by the sensor (111) in successive orbit repeat cycles; and wherein the orbit control module (112) is configured to perform orbit maintenance maneuvers by operating the propulsion system (113) so as to keep the altitude of the satellite (11) and the translation of the ground track of satellite (11) stable and maneuvers for reversing the ground track of satellite (11) by operating the propulsion system (113) so as to take the satellite (11)

from the first predefined altitude to the second predefined altitude after a first predefined period of time in which its ground track has undergone the first translation, and from the second predefined altitude to the first predefined altitude after a second predefined period of time in which its ground track has undergone the second translation.

8. The satellite remote sensing system of claim 7, wherein the propulsion system (113) comprises:

an ion propulsion system; and a chemical propulsion system;

and wherein the orbit control module (112) is designed to perform:

the orbit maintenance maneuvers by operating the ion propulsion system; and the maneuvers for reversing the longitudinal translation of the ground track of the satellite (11) by operating the chemical propulsion system.

9. The satellite remote sensing system of claim 7, wherein the propulsion system (113) is a chemical propulsion system.

10. The satellite remote sensing system of claim 7, further comprising a ground station (12) that is positioned on the Earth's surface, is configured to receive the images acquired by the sensor (111) from the satellite (11) and includes a mission control system (121) designed to:
- remotely control the orbit control module (112);
- enable a user to modify the values of the first and second predefined altitudes so as to set a new predefined interferometric baseline; and
- communicate the modified values of the first and second predefined altitudes to the orbit control module (112) so that said orbit control module (112) starts to control the satellite (11) in accordance with said modified values so as to ensure the new predefined interferometric baseline requested by the user.

11. The satellite remote sensing system according to claim 7, wherein the sensor (111) is a Synthetic Aperture Radar (SAR) and wherein the predefined orbit is a polar sun synchronous orbit or an inclined orbit.

12. The satellite remote sensing system according claim 7, wherein the sensor (111) is an optical sensor and wherein the predefined orbit is a polar sun synchronous orbit.

* * * * *